United States Patent

[11] 3,570,814

[72] Inventor Paul J. Zuppiger
 Athenaz, Switzerland
[21] Appl. No. 801,669
[22] Filed Feb. 24, 1969
[45] Patented Mar. 16, 1971
[73] Assignee MacGregor-Comarain
 Paris, France

[54] TRACTION CYLINDER
 9 Claims, 5 Drawing Figs.
[52] U.S. Cl......................................................... 254/150,
 29/113, 242/47.01
[51] Int. Cl.......................................................... B66d 1/30
[50] Field of Search............................................ 254/150,
 168, 139, 186, 135; 242/47.01; 226/1, 75, 191;
 29/113, 115

[56] References Cited
FOREIGN PATENTS
434,637 10/1967 Switzerland.................. 254/150

Primary Examiner—Harvey C. Hornsby
Attorneys—Kenyon & Kenyon and Reilly, Carr & Chapin ABSTRACT: The fluid-actuated traction cylinder according to the invention is of particular utility notably in the interior of deformable collapsible chambers. It comprises a substantially cylindrical tubular supple deformable enclosure closed at both ends and the lateral surface of which comprises elements articulated with one another along the generatrices of the surface of said cylindrical enclosure, supple band means, mounted on said cylindrical surface and having its ends attached to said members, and means for inflating or deflating said enclosure by means of a pressurized fluid.

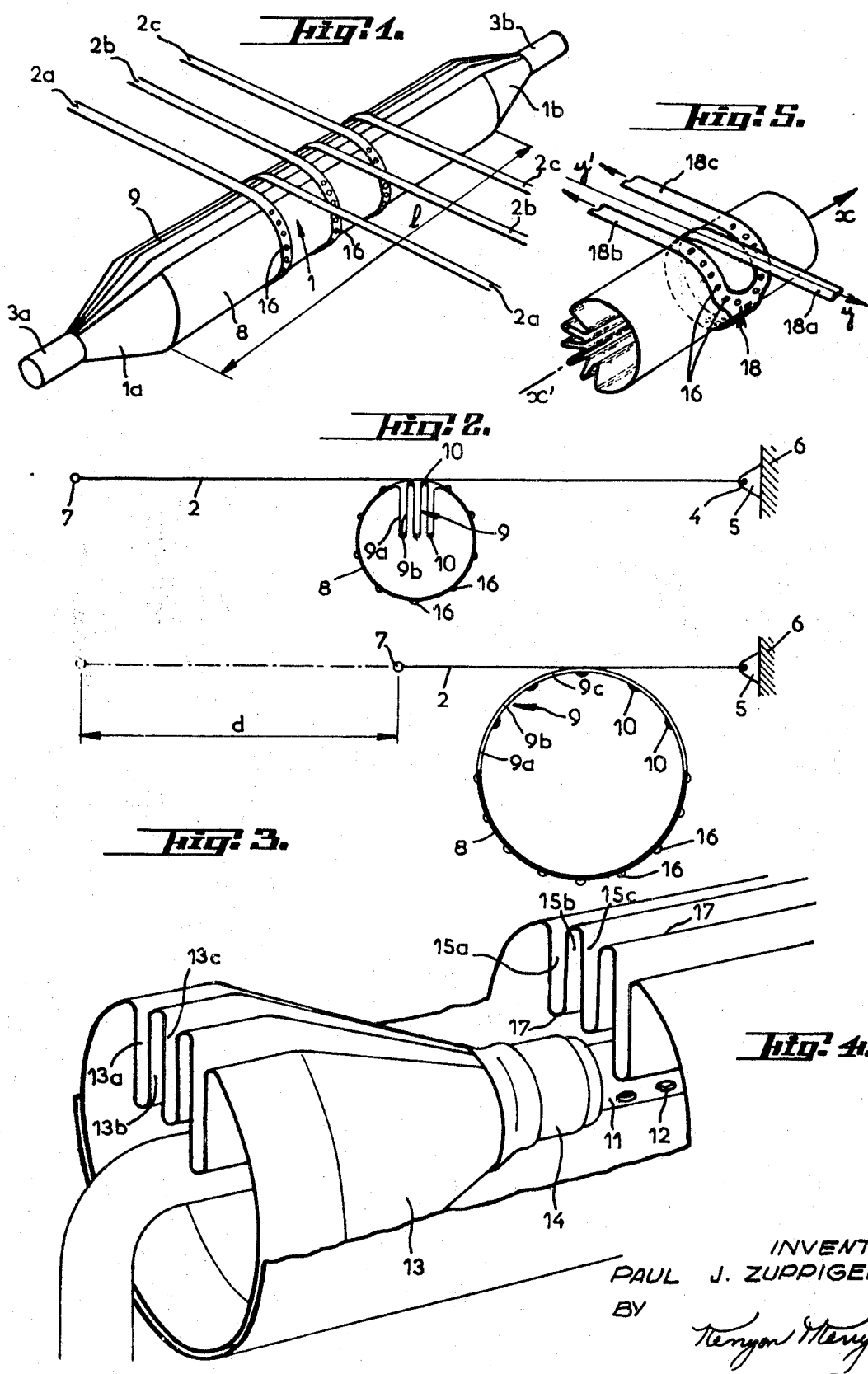

TRACTION CYLINDER

The present invention has for its object a fluid-actuated traction cylinder suitable for use, notably, in the interior of yieldable or deformable chambers subjected to external loads capable of collapsing the same, the said traction cylinder being designed so that its elements will not injure the wall of the said chambers.

This traction cylinder may, for instance, be advantageously used for producing contractions or shrinkings of the various enclosures provided in handling devices of the type described in the U.S. Pat. application Ser. No. 766,168 filed on Oct. 9, 1968 and entitled "Handling device".

The traction cylinder according to the invention is remarkable notably in that it comprises:

a substantially cylindrical tubular deformable supple enclosure with closed ends, the lateral surface of which comprises elements articulated with one another along the generatrices of the said cylindrical surface;

at least one supple band, strap or the like rolled round or fixed to the said cylindrical surface and the ends of which are fixed to the elements which it is desired to move nearer to one another;

means for inflating or deflating the said enclosure by means of pressurized fluid.

According to another characteristic feature of the invention, at least some of the said articulated elements of the said supple cylindrical enclosure are inextensible.

Advantageously there is provided such an inextensible element to which the said band or the like is fixed and which has a section substantially in the shape of an arc of a circle, the curvature of which varies according to the inflating of the traction cylinder and which in the deflated state forms an almost closed circle in which are located the other accordion-pleated elements of the enclosure.

The invention will be understood more clearly from the following description of some forms of embodiment given solely by way of example with reference to the following drawings in which:

FIG. 1 is a diagrammatic perspective view of a traction cylinder at rest, according to the invention;

FIGS. 2 and 3 are diagrammatic cross-sectional views of the traction cylinder shown in FIG. 1, illustrating two stages of operation;

FIG. 4 is a perspective view, with a part broken away, of an element of the traction cylinder according to a modified form of embodiment;

FIG. 5 shows a modified form of embodiment of a traction band represented in FIG. 1.

According to the form of embodiment illustrated in FIGS. 1 to 3, a traction cylinder is formed of a substantially cylindrical tubular supple deformable enclosure 1 around which are rolled three supple inextensible straps 2a, 2b and 2c and which is adapted to be filled with pressurized fluid, for instance compressed air, supplied from a source (not shown) through conduits 3a, 3b extending from each end of the enclosure.

The straps 2a, 2b and 2c are designed to be attached, at one end, to a stationary bearing point materialized in the drawing by a fitting 5 embedded in a wall element 6, the other end being attached to a point 7 of the object on which the traction cylinder according to the invention is to exert a traction force.

The traps may be replaced by any other adequate flexible inextensible ties such as strings, cords, cables, chains, strips, laces, etc...

Part of the periphery of the enclosure 1 is constituted by an element forming a thin supple inextensible wall 8 in the shape of an arc of a circle, whereas the remaining part is constituted by an advantageously inextensible wall 9 capable of becoming accordion-pleated and sealingly connecting the longitudinal edges of the thin wall 8.

The straps 2a, 2b and 2c may be fixed to the thin wall 8 by any appropriate means, for instance by sticking or riveting as shown at 16, or may simply be made to adhere to the enclosure without being materially secured to the latter. Alternatively, the portion of the strap fixed to the thin wall 8 may be dispensed with, except on the portions of the thin wall adjacent to the free portions of the strap.

Advantageously, elastic stiffening ribs 10 may be provided on the wall 9 along folding generating lines; the said ribs may be secured, for instance stuck, to the wall 9, or, alternatively, made integral with the latter; in the latter case they may consist of extra-thicknesses corresponding to the said wall.

The said ribs are sufficiently rigid to be able, owing to their own elasticity, to move the various elements 9a, 9b, 9c... of the foldable wall 9 back to their folded position when the enclosure 1 is deflated.

The substantially cylindrical enclosure 1 is connected at both ends by truncated portions 1a and 1b to fluid intake and escape conduits 3a, 3b.

The traction cylinder operates as follows:

at rest, that is to say when the enclosure 1 is not inflated, the thin wall 8 is in a cylindrically subsided position and the wall 9 is folded in the opening thereof (FIG. 2).

When pressurized air is blown into the enclosure 1, the latter inflates and the wall 9 of the enclosure (FIG. 3) unfolds in accordion-pleated shape.

During this motion, the strips 2 slide by their free portion over the unfolding wall 9, whereby point 7 moves nearer to point 5 over a distance $d$ corresponding to the variation of the perimeter of the enclosure 1 between the inflated position (FIG. 3) and the deflated position (FIG. 2).

During this displacement of point 7, the effort T put forth by the traction cylinder is equal to;

$$T = \beta \beta p. D. l.$$

where
 $p$ = air pressure
 $D$ = diameter of the enclosure
 $l$ = effective length of the enclosure
 $\beta$ = efficiency of the traction cylinder depending on the elasticity of the enclosure, friction between the straps and the wall, etc...

It is therefore seen that the traction cylinder is capable of exerting on the straps an effort which increases gradually as the diameter D of the enclosure augments, the pressure $p$ remaining constant.

In addition, such a traction cylinder is characterized in that its travel exceeds its dimensions. Furthermore, the said travel may be increased, for instance doubled or trebled, by giving the straps more than one turn, for instance two or three, round the enclosure. In the latter case, the coefficient of friction between the strap and the enclosure must be low.

Since the traction cylinder is made of supple material, it can easily be placed in proximity to very light and delicate pieces of material and even come into contact with the said material without damaging the same.

The return of the traction cylinder to its position of rest (FIGS. 1 and 2) may be obtained in various manners.

For instance, it can take place solely as a result of adequate rigidity of the elements 9a, 9b, 9c... of the wall 9 and the associated stiffening elements 10;

it can result from contraction of the thin wall 8 according to an arc of a circle of smaller radius of curvature (FIG. 2);

a certain amount of axial traction may also be exerted on the enclosure 1, resulting in that the latter is subjected to efforts tending to maintain the same in closed position;

the object on which the traction is to be exerted may be subjected to the action of an elastic return member tending to move the said object back to its initial position when pressure is missing in the enclosure 1.

In the modified form of embodiment shown in FIG. 4, the cylindrical enclosure is traversed over its whole length by a pipe 11 fed with pressurized fluid, for instance air, at both ends and penetrating into the enclosure through dispensing holes 12 provided in the pipe wall.

Both ends of the enclosure are connected to the pipe 11 by two truncated walls 13 of supple inextensible material, preferably a polyamide woven material, secured by sticking to the enclosure itself or a to a rubber sleeve 14 forced onto the pipe. This enclosure, as shown in FIG. 1, is provided with a foldable wall formed of elements 15a, 15b, 15c... articulated according to folding generating lies 17 of the enclosure.

These elements extend over the whole length of the enclosure and are inserted, for instance stuck, in the folds of the same height formed by the corresponding elements 13a, 13b, 13c... of each truncated end wall 13.

In addition to its function consisting in feeding the traction cylinder with air, the conduit 11 also fulfills the function of a resisting member preventing the end walls 13 of the enclosure from being expelled as a result of the pressure of the air contained in the enclosure.

In this modified form of embodiment, the unfolding and folding of the wall 15 are simple and better controlled than in the form of construction shown in FIGS. 1 to 3, and this not only increases the efficiency of the traction cylinder, but also improves its reliability in operation.

In the modification illustrated in FIG. 5, only one traction member 18 is used, the balancing along the line of action $y'y$ perpendicular to the direction of the generatrix $x'x$ of the enclosure 1 being obtained as a result of the symmetrical arrangement of the portion 18a and the portions 18b, 18c of the member 18 on either side of the axis $y'y$.

It is to be understood that the invention should not at all be construed as being limited to the forms of embodiment shown and described, as the latter have been given by way of example only. In particular, the invention comprises all means constituting technical equivalents to the means described as well as their combinations, should they be carried out according to the spirit of the invention.

I claim:

1. A fluid-actuated traction cylinder for moving closer distant members comprising a substantially cylindrical tubular supple deformable enclosure closed at both ends and the lateral surface of which comprises elements articulated with one another along the generatrices of the surface of said cylindrical enclosure, supple band means mounted on said cylindrical surface and having its ends attached to said members and means for inflating or deflating said enclosure with a pressurized fluid.

2. A fluid-actuated traction cylinder according to claim 1, wherein at least some of the said articulated elements of the said supple cylindrical enclosure are inextensible.

3. A fluid-actuated traction cylinder according to claim 2, wherein said band means is secured to one of the said inextensible elements of the enclosure.

4. A fluid-actuated traction cylinder according to claim 2, wherein when the said enclosure is in the deflated state, at least some of the said elements are accordion-pleated.

5. A fluid-actuated traction cylinder for moving closer distant members comprising a substantially cylindrical tubular, supple deformable enclosure closed at both ends and whose lateral surface comprises elements articulated with one another along the generatrices of the surface of said cylindrical enclosure, supple band means mounted on said cylindrical surface and having its ends attached to said members and means for inflating or deflating said enclosure with a pressurized fluid, at least some of the said articulated elements of said supple cylindrical enclosure being inextensible, said band means being secured to one of the said inextensible elements of said enclosure, at least some of said elements being accordion pleated when said enclosure is deflated, and wherein that one of the said inextensible elements to which the said band means is secured has a section substantially in the shape of an arc of a circle whose curvature varies according to the extent of inflation of the traction cylinder and which, in the deflated state of the enclosure, forms an almost closed circle in which said accordion-pleated elements of the enclosure are located.

6. A fluid-actuated traction cylinder according to claim 4, wherein the said accordion-pleated elements are constituted by a zigzag-folded sheet provided along the folding edges with longitudinal stiffening elements of elastic material constituting members serving to return the said enclosure to its folded position.

7. A fluid-actuated traction cylinder for moving closer distant members comprising a substantially cylindrical tubular, supple deformable enclosure closed at both ends and whose lateral surface comprises elements articulated with one another along the generatrices of the surface of said cylindrical enclosure, supple band means mounted on said cylindrical surface and having its ends attached to said members and means for inflating or deflating said enclosure with a pressurized fluid, the said inflating and deflating means comprising fluid inlet and escape openings opening in the enclosure and means comprising supple deformable truncated portions connecting said conduits to the enclosure, the top of each of such truncated portions being connected to a corresponding conduit and the base of each of which truncate portions is connected to the enclosure.

8. A fluid-actuated traction cylinder according to claim 7, wherein each said truncated portion is integral with the enclosure.

9. A fluid-actuated traction cylinder according to claim 7, wherein each said truncated portion consists of a separate member secured to the enclosure and is arranged within the latter with its narrowed portion turned towards the interior of the traction cylinder.

UNITED STATES PATENT OFFICE
CERTIFICATE OF CORRECTION

Patent No. 3,570,814            Dated March 16, 1971

Inventor(s) Paul J. Zuppiger

It is certified that error appears in the above-identified patent and that said Letters Patent are hereby corrected as shown below:

On the cover sheet insert -- [32] Claim priority application Switzerland, 3001/68 Feb. 28, 1968 --.

Signed and sealed this 17th day of August 1971.

(SEAL)
Attest:

EDWARD M. FLETCHER, JR.          WILLIAM E. SCHUYLER, JR.
Attesting Officer                 Commissioner of Patents